US012647342B2

(12) United States Patent　(10) Patent No.:　US 12,647,342 B2
Prasad et al.　(45) Date of Patent:　Jun. 2, 2026

(54) GENERATING NETWORK DEFINITIONS FROM HIERARCHICAL TOPOLOGY OF CONTROL AND STATUS REGISTERS

(71) Applicant: Baya Systems, Inc., Santa Clara, CA (US)

(72) Inventors: Honnahuggi Harinath Venkata Naga Ambica Prasad, Bengaluru (IN); Narayana Sri Harsha Gade, Bangalore (IN); Eric Norige, Santa Clara, CA (US)

(73) Assignee: BAYA SYSTEMS, INC., Santa Clara, CA (US)

( * ) Notice: Subject to any disclaimer, the term of this patent is extended or adjusted under 35 U.S.C. 154(b) by 39 days.

(21) Appl. No.: 19/012,662

(22) Filed: Jan. 7, 2025

(65) Prior Publication Data

US 2026/0128978 A1　May 7, 2026

(30) Foreign Application Priority Data

Nov. 5, 2024　(IN) ............................. 202411084721

(51) Int. Cl.
G06F 15/173　(2006.01)
G06F 9/30　(2018.01)
G06F 12/08　(2016.01)
H04L 45/02　(2022.01)
(52) U.S. Cl.
CPC .......... H04L 45/02 (2013.01); G06F 9/30098 (2013.01); G06F 12/08 (2013.01)

(58) Field of Classification Search
None
See application file for complete search history.

(56) References Cited

U.S. PATENT DOCUMENTS

| | | | | |
|---|---|---|---|---|
| 2020/0092230 A1* | 3/2020 | Schultz | ................. | H04L 49/109 |
| 2021/0150328 A1* | 5/2021 | Dasalukunte | .......... | G06N 3/065 |
| 2022/0191127 A1* | 6/2022 | Kopser | .............. | G06F 13/1642 |
| 2022/0210056 A1* | 6/2022 | Agarwal | ................. | H04L 45/38 |
| 2024/0235984 A1* | 7/2024 | Chunduri | .............. | H04L 45/302 |
| 2024/0356544 A1* | 10/2024 | Nerukonda | ......... | G06F 13/4022 |
| 2025/0007825 A1* | 1/2025 | Mahadevan | ............ | H04L 45/42 |
| 2026/0012422 A1* | 1/2026 | Prasad | .................. | H04L 47/125 |
| 2026/0050442 A1* | 2/2026 | Prasad | ............... | G06F 9/30123 |
| 2026/0067234 A1* | 3/2026 | Prasad | ................... | H04L 49/25 |

* cited by examiner

*Primary Examiner* — Phuoc H Nguyen
(74) *Attorney, Agent, or Firm* — Procopio, Cory, Hargreaves & Savitch LLP

(57)　ABSTRACT

System and method for generating a Network on Chip (NoC) includes intaking a specification, where the specification includes, for each sub-NoC design, hierarchical topology and Control/Status Register (CSR) controllers of the each sub-NoC with locations thereof. Further, for each of the CSR controller in the sub-NoC, the sub-NoC design includes a set of CSR endpoints that is communicatively coupled to the each of the CSR controllers and ingress and egress points of a boundary of the each sub-NoC. The network definition is generated for the each sub-NoC design from computation of routes between the locations of each pair of the CSR controllers and the set of CSR endpoints that communicate via a routing graph defined from the hierarchical topology that is adjusted based on the ingress and egress points. NoCs may be generated based on the network definitions.

15 Claims, 12 Drawing Sheets

200

300

500

700A

700B

GENERATING NETWORK DEFINITIONS FROM HIERARCHICAL TOPOLOGY OF CONTROL AND STATUS REGISTERS

CROSS-REFERENCE TO RELATED APPLICATIONS

This application claims priority to IN 202411084721, filed on Nov. 5, 2024, the contents of which are incorporated herein by reference.

BACKGROUND

Technical Field

Methods and example embodiments described herein are generally directed to designing registers for components of Network on Chips (NoCs), and more specifically, to automatic generation of control and status registers (CSRs) based on component configurations of the NoC.

Related Art

The number of components on a chip is rapidly growing due to increasing levels of integration, system complexity, and shrinking transistor geometry. Complex System-on-Chips (SoCs) may involve a variety of components, e.g., processor cores, digital signal processors (DSPs), hardware accelerators, memory, and Input/Output (I/O) subsystems, while Chip Multi-Processors (CMPs) may involve a large number of homogenous processor cores, memory, and I/O subsystems. In both systems, the on-chip interconnect plays a key role in providing high-performance communication between the various components. Due to scalability limitations of traditional buses and crossbar-based interconnects, Network-on-Chip (NoC) has emerged as a paradigm to interconnect a large number of components on the chip.

NoC is a global shared communication infrastructure made up of several routing nodes interconnected with each other using point-to-point physical links. Messages are injected by the source and are routed from the source node/router to the destination node/router over multiple intermediate nodes and physical links. The destination node/router then ejects the message and provides it to the destination. For the remainder of the document, terms 'processing elements,' 'components,' 'blocks,' 'hosts,' or 'cores,' will be used interchangeably to refer to the various system components which are interconnected using a NoC. Further, terms 'routers' and 'nodes' may also be used interchangeably. Without loss of generality, the system with multiple interconnected components will itself be referred to as a 'multi-core system.'

There are several possible topologies in which the routers can connect to one another to create the system network. Bi-directional rings 100A (as shown in FIG. 1A) and 2-D mesh 100B (as shown in FIG. 1B) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers, with each such port having a unique identifier (ID). Packets carry the destination's router and port ID for use by the intermediate routers to route the packet to the destination component.

Examples of routing techniques include deterministic routing, which involves choosing the same path from A to B for every packet. This form of routing is oblivious to the state of the network and does not load balance across path diversities which may exist in the underlying network. However, such deterministic routing may be simple to implement in hardware, maintains packet ordering, and may be easy to make free of network-level deadlocks. Shortest path routing minimizes the latency as it reduces the number of hops from the source to the destination. For this reason, the shortest path is also the lowest power path for communication between the two components. Dimension-order routing is a form of deterministic shortest-path routing in 2D mesh networks.

FIG. 2 illustrates an example of XY routing in a two-dimensional mesh 200. More specifically, FIG. 2 illustrates XY routing from node '34' to node '00.' In the example of FIG. 2, each component is connected to only one port of one router. A packet is first routed in the X dimension till the packet reaches node '04,' where the x dimension is same as the destination. The packet is next routed in the Y dimension until the packet reaches the destination node.

Source routing and routing using tables are other routing options used in NoC. Adaptive routing can dynamically change the path taken between two points in the network based on the state of the network. This form of routing may be complex to analyze and implement and is therefore rarely used in practice.

A NoC may contain multiple physical networks. Over each physical network, there may exist multiple virtual networks, where different message types are transmitted over different virtual networks. In this case, at each physical link or channel, there are multiple virtual channels, where each virtual channel may have dedicated buffers at both end points. In any given clock cycle, only one virtual channel can transmit data on the physical channel.

NoC interconnects often employ wormhole routing, where a large message or packet is broken into small pieces known as flits (also referred to as flow control digits). The first flit is the header flit which holds information about the packet's route and key message level information along with payload data and sets up the routing behavior for all subsequent flits associated with the message. Zero or more body flits follow the head flit, containing the remaining payload of data. The final flit is a tail flit which in addition to containing the last payload also performs some bookkeeping to close the connection for the message. In wormhole flow control, virtual channels are often implemented.

The physical channels are time-sliced into a number of independent logical channels called virtual channels (VCs). VCs provide multiple independent paths to route packets; however, they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" refers to the way messages are transmitted over the channels; the output port at the next router can be so short that received data can be translated in the head flit before the full message arrives. This allows the router to quickly set up the route upon arrival of the head flit and then opt-out from the rest of the conversation. Since a message is transmitted flit by flit, the message may occupy several flit buffers along its path at different routers, creating a worm-like image.

Based on the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, all channels are equal in width or number of physical wires. This width can be determined based on the most loaded channel and the clock frequency of various channels.

Routers or nodes in the NoC are associated with Control/Status Registers (CSRs). Each of such registers are addressable units of CSR configuration, usually 32 or 64 bits, that are atomically modifiable. The registers include fields that have a single function/purpose. For example, an address map configuration register may have a single-bit field that controls whether the address map entry corresponding to that register is enabled (participates in address decode). That register may also have another field controlling which addresses matches this address range.

Registers have defined access types that specify how the register interacts with CSR controllers and NoC components. The simplest access types are read-only and read-write, with many registers being non-modifiable by the CSR controller and others being fully reprogrammable. Additionally, information about how the component interacts with the register can also be captured. Status registers are usually "volatile," meaning that their value can be and will be changed (by the component) without any write command from the CSR controller. Some registers are "Write zero to clear," meaning that writing a value other than 0 will not have any effect and only writing the value 0 clears the register. Other kinds of access types are known to those skilled in the art.

Registers also have multi-bit field called "bit enables," which can have some of its bits "disabled" or fixed to a particular value to reduce implementation cost. The pattern of disabled bits within a field is captured by that field's bit enables.

During construction of the NoC, CSRs networks are formed where CSR endpoints are associated with CSR controllers using which the values in the CSR registers of the CSR endpoints are controlled. Paths may be determined for enabling communication between the CSR controllers and the CSR endpoints within the CSR network. However, existing solutions do not allow the endpoints to be associated with the CSR controllers in a modular and hierarchical manner (which is suitable for applications requiring multi-instancing), and impose design limitations that reduce flexibility for designers/users for optimizing the CSR networks.

There exists a need for methods, systems, and computer readable mediums for overcoming the above-mentioned issues with existing implementations for generating CSRs.

SUMMARY

Aspects of the present disclosure are directed to a method for generating a Network on Chip (NoC), which includes intaking a specification. The specification includes, for each sub-NoC design, hierarchical topology and Control/Status register (CSR) controllers of the each sub-NoC with locations. Further, for each of the CSR endpoints in the sub- NoC, the sub-NoC design includes a set of CSR endpoints that is communicatively coupled to the each of the CSR controllers and ingress and egress points of a boundary of the each sub-NoC. The method includes generating a CSR network definition for the each sub-NoC design by computing/determining routes between the locations of each pair of the CSR controllers and the set of CSR endpoints that may communicate via a CSR routing graph defined from the hierarchical topology, which may be adjusted based on the ingress and egress points along the routes. The method also includes generating a NoC based on the CSR network definitions.

Additional aspects of the present disclosure are directed to a computer-readable storage medium storing instructions for executing a process. The instructions include intaking a specification. The specification includes, for each sub-NoC design, hierarchical topology and CSR controllers of the each sub-NoC with locations. Further, for each of the CSR controllers in the sub-NoC, the sub-NoC design includes a set of CSR endpoints that is communicatively coupled to the each of the CSR controllers and ingress and egress points of a boundary of the each sub-NoC. The instructions include generating a network definition for the each sub-NoC design from computation of routes between the locations of each pair of the CSR controllers and the set of CSR endpoints that communicate via a routing graph defined from the hierarchical topology, which may be adjusted based on the ingress and egress points. The instructions also include generating the NoC based on the network definitions.

Further aspects of the present disclosure are directed to a system having a control module configured to intake a specification including, for each sub-NoC design, hierarchical topology and CSR controllers of the each sub-NoC with locations. Further, for each of the CSR controllers in the sub-NoC, the sub-NoC design includes a set of CSR endpoints that is communicatively coupled to the each of the CSR controllers and ingress and egress points of a boundary of the each sub-NoC. The control module is configured to generate a CSR network definition for the each sub-NoC design from computation of routes between the locations of each pair of the CSR controllers and the set of CSR endpoints that communicate via a CSR routing graph defined from the hierarchical topology, which may be adjusted based on the ingress and egress points. The control module is also configured to generate the NoC based on the CSR network definitions.

DETAILED DESCRIPTION

Figure 1A:
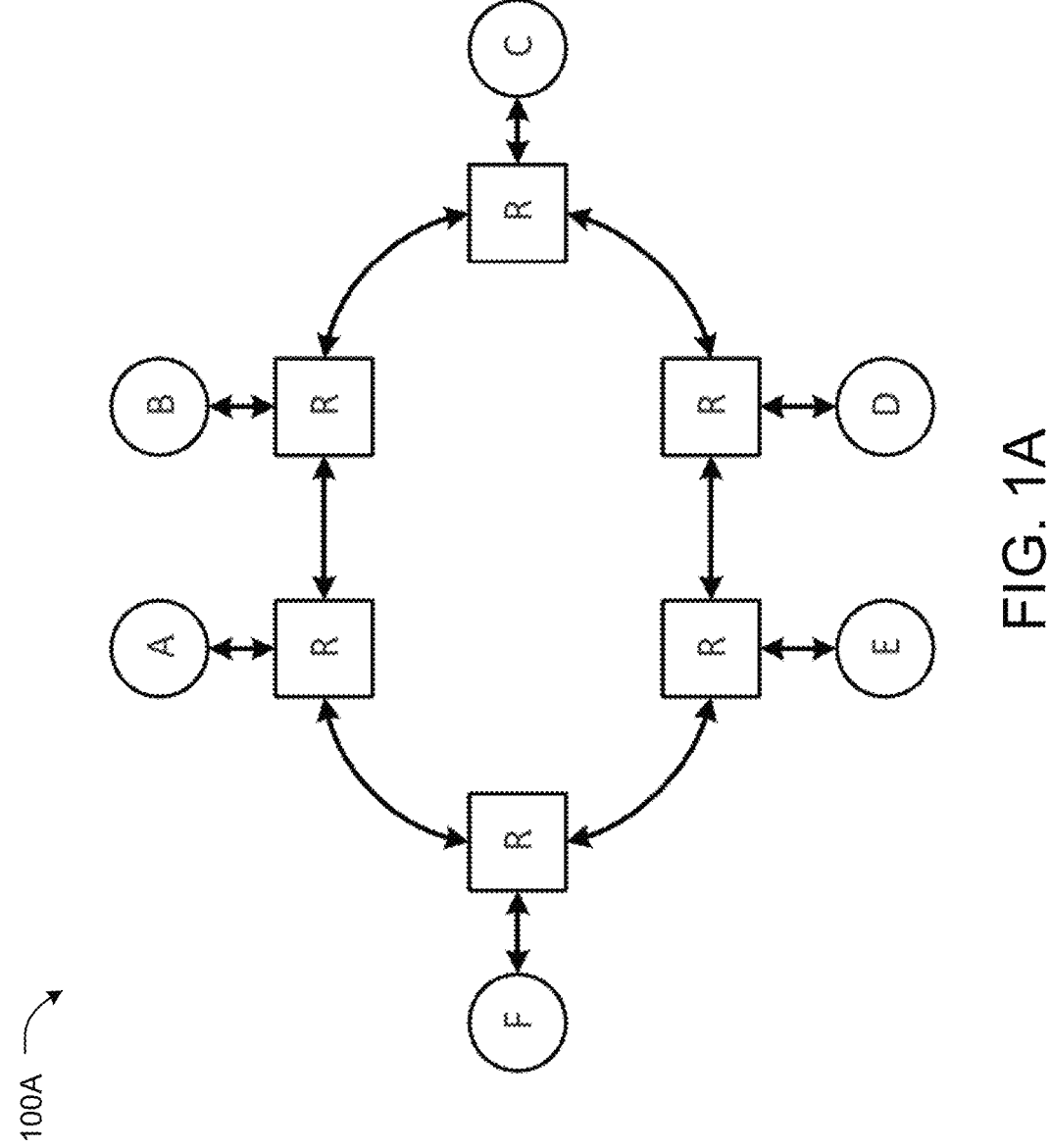
FIGS. 1A and 1B illustrate examples of Bidirectional ring and 2D Mesh Network on Chip (NoC) topologies.
Figure 1B:
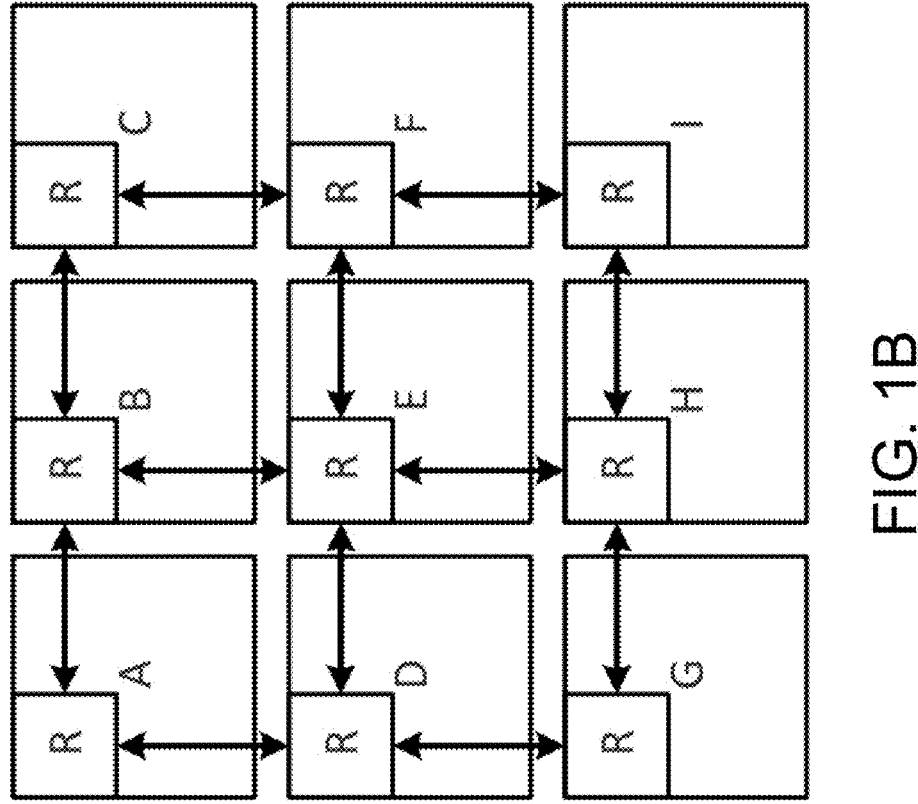
Figure 2:
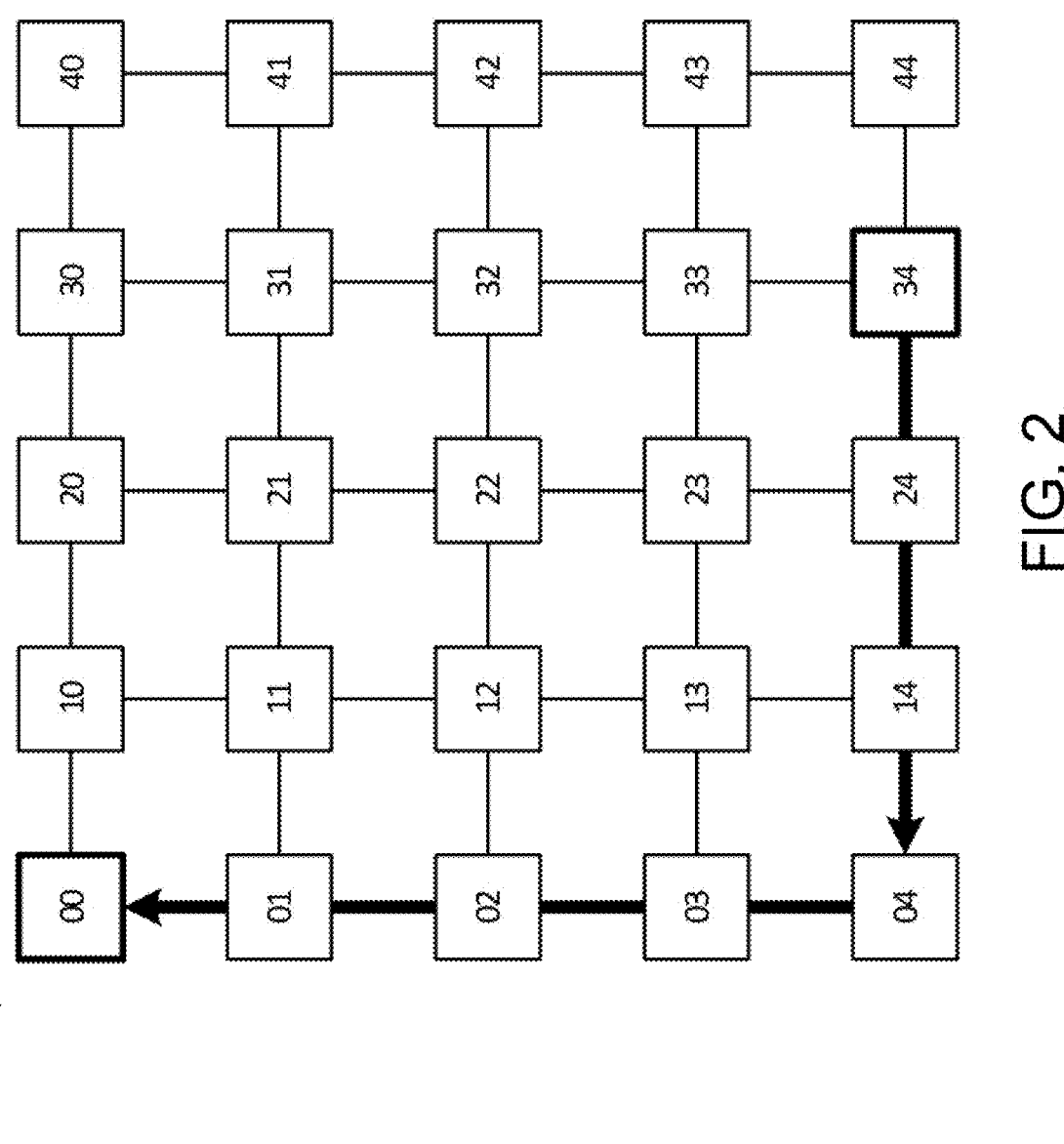
FIG. 2 illustrates an example of XY routing in a NoC having a two-dimensional mesh topology.

The following detailed description provides further details of the figures and example implementations of the present application. Reference numerals and descriptions of redundant elements between figures are omitted for clarity. Terms used throughout the description are provided as examples and are not intended to be limiting. For example, the use of the term 'automatic' may involve fully automatic or semi-automatic implementations involving user or administrator control over certain aspects of the implementation, depending on the desired implementation of one of ordinary skill in the art practicing implementations of the present disclosure.

Control/status registers (CSRs) are used for storing control and/or status information or instructions associated with the operation of components/elements in a Networks on Chip (NoC) and/or System on Chips (SoCs). The CSRs (also interchangeably referred to as registers) are typically implemented within NoC components, such as within (data) routers, bridges, Cache Coherency Controllers (CCCs), Last Level Caches (LLCs), and the like. The CSRs may store configuration or status information that may be written and/or read by the components during operation. The CSRs of the components may also be serviced by a CSR controller (which in turn may receive requests/commands from external agents for reconfiguring the components, for example) through a set of CSR endpoints corresponding to the components of the NoC. Values in the CSR registers may be retrieved and/or updated by the CSR controller based on the requirements of the use case. CSR registers may also be organized as CSR banks, which include multiple CSR registers stored in the same location/NoC component.

CSR controllers use different channels or wires to communicate with the CSR endpoints than those used for transmitting data packets through the NoC components, such as data routers of the NoC. The channels between the CSR controllers and the CSR endpoints are designed and constructed separately from data paths of the NoC, due to their unique requirements, topologies, constraints, and the like. Existing solutions are typically unable to build CSR network definitions for NoC designed with a combination of multiple sub-NoCs and/or NoC components, while also taking ingress and egress points of the sub-NoC into consideration which allow CSR controllers to service endpoints outside the sub-NoC. Further, existing solutions do not avoid and/or handle cross sub-NoC channels/links between endpoints and CSR controllers, and comply with other design constraints/requirements which may be apparent when CSR network definitions are required for NoCs built in a modular manner (such as using multi-instancing).

The present disclosure describes a method (which may be implemented using a system, or implemented as a computer-readable medium) that includes generating the CSR network definitions for NoCs, given specifications associated with sub-NoCs that are used to build the NoC. The CSR network definitions may be used for elaboration. Once specifications of the sub-NoCs forming the CSR networks are defined, mappings including request channels and response channels between the CSR controllers and the CSR endpoints are determined, and elaborated for constructing the NoC. The present disclosure also provides for optimization of the CSR network definitions, such as through consolidation of the registers associated with multiple components/elements to form register banks or CSR banks, which may reduce the number of CSR endpoints required for implementing the CSR network and thereby reduce cost and complexity. Various embodiments of the present disclosure are described in reference to FIG. 3 to FIG. 8.

Figure 3:
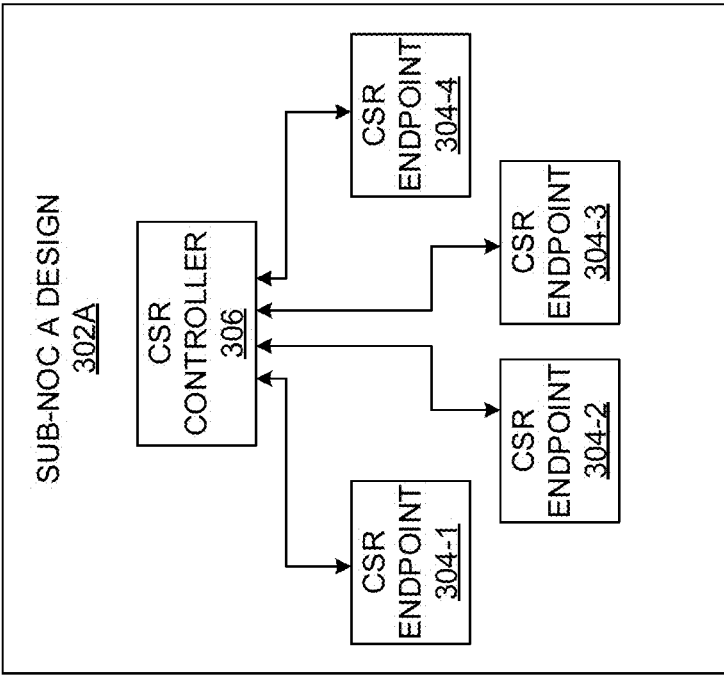
FIG. 3 illustrates a schematic representation of a sub-NoC design having control and status registers (CSRs) endpoints, and a sub-NoC design having both CSR endpoints and CSR controllers, in accordance with an example implementation.
Figure 3:
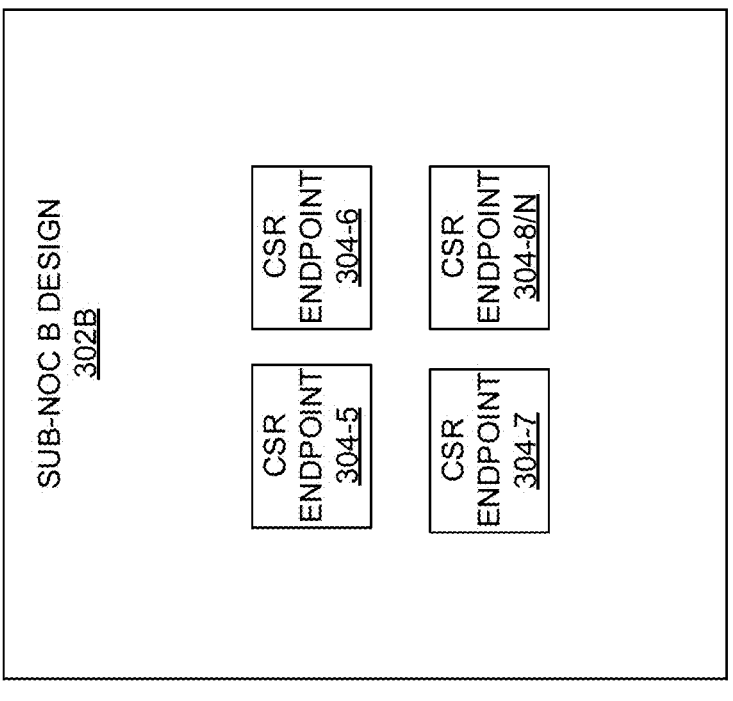

Referring to FIG. 3, NoCs (such as NoC 402 shown in FIGS. 4A to 4D) may be built using multiple sub-NoCs and NoC components arranged in a hierarchy. In some embodiments, the sub-NoCs may adhere to either sub-NoC design 302A or sub-NOC design 302B (collectively referred to as sub-NoC designs 302). Multiple sub-NoCs either adhering to sub-NoC designs 302A or 302B may be implemented to form a hierarchical topology, which forms the NoC 402.

In some embodiments, the sub-NoC designs 302 may include one or more CSR endpoints, such as endpoints 304-1 to 304-8/N (collectively referred to as endpoints 304). In some embodiments, the CSR endpoints 304 may have multiple (CSR) registers associated therewith. The registers in each of the CSR endpoints 304 may have properties thereof optimized/customized for different use cases. The properties of the registers which may be optimized may include the number of fields in each register/CSR, the number of bits in each field, the number of physical registers to be created, enabling bits, reset values, and the like. The properties may be optimized based on the configurations of the components of the NoC 402. The sub-NoC designs 302A and 302B may be differentiated in that sub-NoC design 302A may include a CSR controller 306, which may be configured to service at least the CSR endpoints 304 below or at the same level of the hierarchy. For example, the CSR endpoints 304-1 to 304-4 may be serviced by the CSR controller 306. Further, the endpoints 304-5 to 304-8 may be serviced by either the CSR controller 306 in the parent or peer sub-NoC in the hierarchical topology. It is appreciated by those skilled in the art that topologies of the sub-NoCs designs 302A and 302B may be suitably adapted based on requirements of the use case, and may not be limited to those shown in FIG. 3.

In some embodiments, instances of the sub-NoCs adhering to sub-NoC designs 302A and 302B may include one or more ingress points and one or more egress points (shown as ingress-egress points 404 in FIGS. 4D and 6A to 6D) for moving CSR traffic in and out of the sub-NoC instances. For example, when the CSR endpoints 304-5 to 304-8 are serviced by the CSR controller 306 in a first sub-NoC instance of sub-NoC design 302A, requests and responses from the CSR controller 306 of the first sub-NoC instance may be transmitted through and received from, respectively, the ingress-egress points 404 of a second sub-NOC instance of the sub-NoC design 302B. In some embodiments, the ingress-egress points 404 may be associated with one or a set of routers at the boundary of the sub-NoC instances or specific ports thereof.

Each of the sub-NoCs, whether adhering to any of the sub-NoC designs 302A or 302B, may have a specification associated therewith. In some embodiments, the specification may be provided by a user/designer of the NoC 402. In other embodiments, the specification may be inferred from the hierarchical topology of the NoC 402, such as using the data paths thereof. In some embodiments, the specification may include a hierarchical topology and CSR controllers 306 for each of the sub-NoCs, and locations of each of the CSR controllers (and/or the CSR endpoints 304) in the sub-NoC. The hierarchical topology may correspond to the arrangement of instances of different sub-NoCs and NoC components, that compose each sub-NoC. The location may refer to physical location of the CSR endpoints with respect to their arrangement on the NoC 402. Further, the specification may include a set of CSR endpoints 304 that is communicatively coupled to the each of the CSR controllers 306. In some embodiments, the set of CSR endpoints may include the CSR endpoints 304 within the sub-NoC (such as sub-NoCs 302A-1 to 302A-4) and the CSR endpoints 304 that are outside the sub-NoC (such as CSR endpoints 304-5 to 304-8, with respect to instances of sub-NoC designs 302A and 302B). In some embodiments, the CSR endpoints 304 may be configured to communicate with a remote CSR controller, such as when the second CSR endpoints communicate with the CSR controller 306 through the same transport network as the first CSR endpoints. The specification may also include ingress and egress points 404 of a boundary of each of the sub-NoCs. In some embodiments, the specification may also include (controller) access points and a mapping of the CSR endpoints and the access points to the CSR controllers 306 of the system/NoC 402. The access points may be part/components at boundaries of the sub-NoC, and may be configured to allow the CSR endpoints 304 and CSR controllers 306 of different sub-NoCs to communicate with each other.

Certain example specifications of the NoC are illustrated in reference to FIGS. 4A to 4D.

Figure 4B:
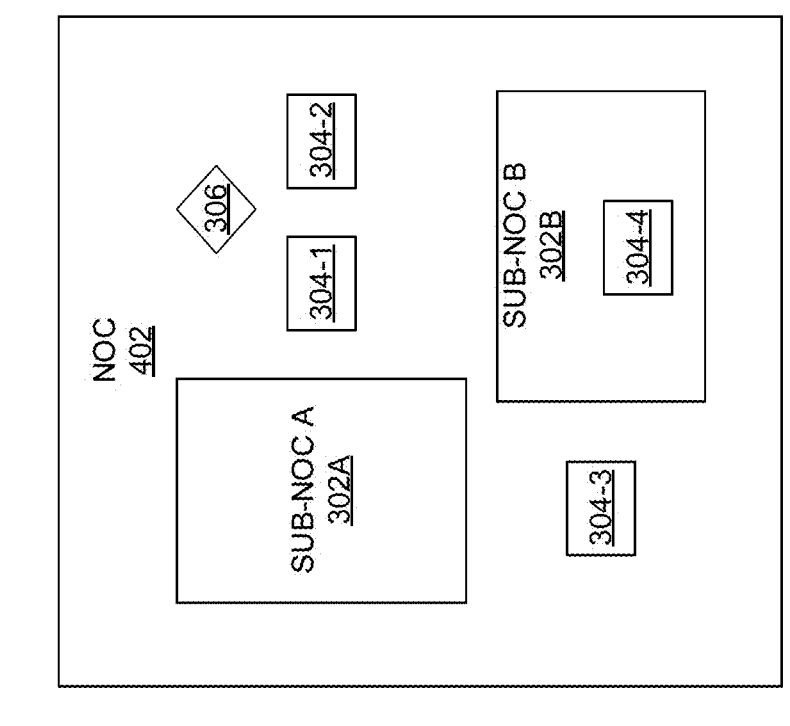
FIGS. 4A-4D illustrate schematic representations of multiple specifications of sub-NoCs, in accordance with an example implementation.
Figure 4A:
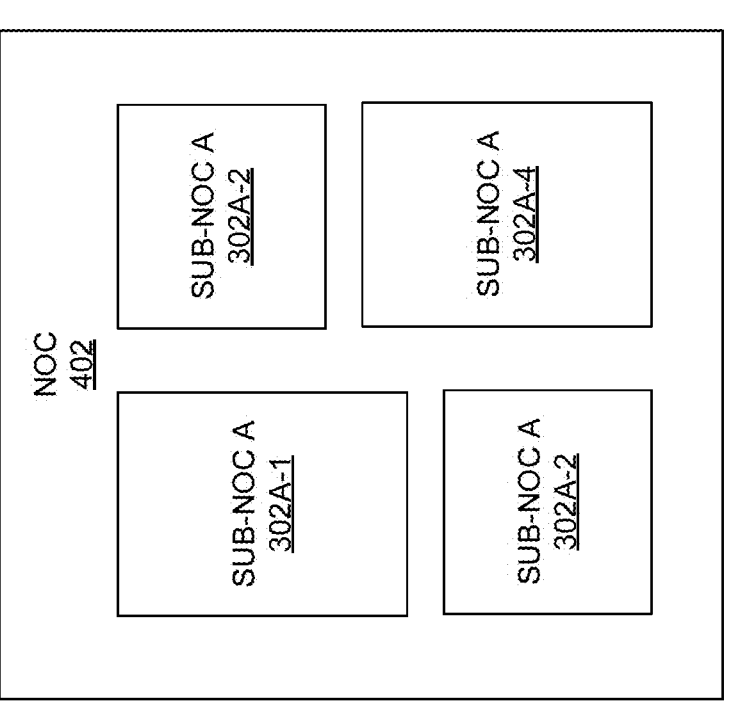

Referring to representation 400A of FIG. 4A, the NoC 402 may include one or more sub-NoC instances, each implementing the sub-NoC design 302A. In such embodiments, the sub-NoCs may be configured to operate independently of other sub-NoCs within the NoC 402, where the CSR endpoints 304 of the sub-NoCs within the NoC 402 may be configured to communicate with the corresponding CSR controllers 306 without any inter sub-NoC CSR traffic. When the specification indicates that each sub-NoCs has corresponding CSR controllers 306, a flat connection graph may be generated as a tree originating from the CSR controller 306 within each sub-NoC instance to the CSR endpoints 304 thereof, as described subsequently in detail with reference to FIGS. 5 to 6D. In the example representation 400A, 4 independent trees may be generated in the flat connection graph.

Referring to representation 400B of FIG. 4B, the NoC 402 may include a heterogenous hierarchy of multiple sub-NoCs implementing both the sub-NoC designs 302A and 302B, and CSR endpoints 304-1 to 304-3 of other NoC components. The NoC 402 may also include other NoC components that are at the same level of hierarchy as the sub-NoC instances, such as endpoints 304-1 to 304-3, and CSR controller 306. The sub-NoC instance of design 302A may also include a CSR controller 306 for servicing the CSR endpoints 304 thereof independently of other sub-NoC instances or NoC components, which are not shown for the purposes of clarity. In such embodiments, at least one CSR controller 306 may be provided at the top-most hierarchy of the NoC 402. The network/hierarchy may be generated as a tree originating from the CSR controller 306 to the CSR endpoints 304-1 to 304-3 associated with the NoC components 406, and the CSR endpoint 304-4 within the sub-NoC instance of design 302B. In such embodiments, the CSR controller 306 may be configured to communicate with the CSR endpoints 304 within its own hierarchy as well as its child hierarchies (i.e. sub-NoCs 302B).

Figure 4D:
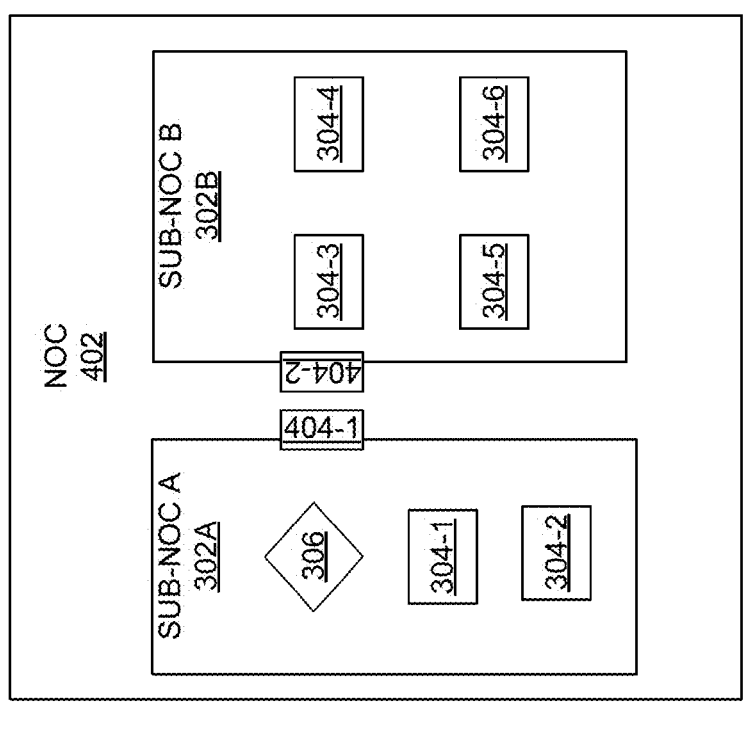
Figure 4C:
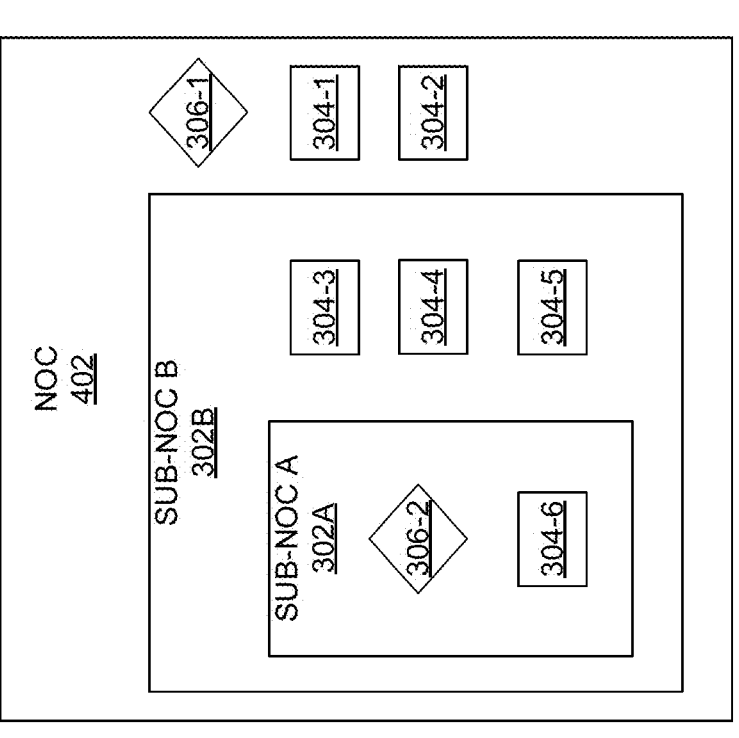

Referring to representation 400C in FIG. 4C, the NoC 402 may also have a heterogenous hierarchy formed using instances of sub-NoC design 302A, sub-NoC design 302B, and/or the NoC components associated with independent NoC components. In such embodiments, each of the CSR endpoints 304 may be configured to communicate with the CSR controller 306 in the same level of hierarchy, or the CSR controller 306 in the immediate higher level of the hierarchy (i.e., the CSR controller 306 in the first available parent). For example, the NoC 402 may include the CSR controller 306-1 in the top-most level of the hierarchy, which may be configured to control/service the CSR endpoints 304-1 to 304-3, as well as CSR endpoints 304-3 to 304-5 in the sub-NoC instance 302B. Further, the sub-NoC instance 302B may include the sub-NoC instance 302A. In such examples, the CSR endpoint 304-6 in the sub-NoC instance 302A may be controlled/serviced by the CSR controller 306-2, which is the CSR controller 306-2 at the first available parent sub-NoC in the hierarchy.

Referring to representation 400D of FIG. 4D, the NoC 402 may allow peer sub-NoC instances (i.e. the sub-NoC instances at the same level of hierarchy). In some embodiments, the CSR controller 306 in the peer sub-NoC instance may be used when none of the parent sub-NoCs have CSR controllers 306 to service/control the sub-NoC. In the example shown in FIG. 4D, the CSR controller 306 in the sub-NoC instance 302A may be configured to service both the CSR endpoints 304-1 and 304-2 within the sub-NoC instance 302A, and the CSR endpoints 304-3 to 304-6 in the sub-NoC instance 302B. In such embodiments, the sub-NoC instances 302A and 302B may include ingress and egress points 404-1 and 404-2 to allow CSR traffic between the CSR controller 306 and the CSR endpoints 304-3 to 304-6 to exit sub-NoC instance 302A and enter sub-NoC instance 302B, respectively.

In some embodiments, the user/designer may provide the location of the CSR controller 306 and the CSR endpoints 304 in each specification of the sub-NoCs. The CSR endpoints 304 may be automatically added to specification/inferred based on the CSR-related properties such as the number of clusters, number of bits in the registers, and the like, that the user has enabled. For example, based on the CSR-related properties being enabled, corresponding endpoints in the routers or bridges may be enabled. The CSR endpoints 304 may be automatically added wherever the bridge or the router is present. Each of the CSR endpoints 304 may be associated with the closest CSR controller 306 in the hierarchy.

Figure 5:
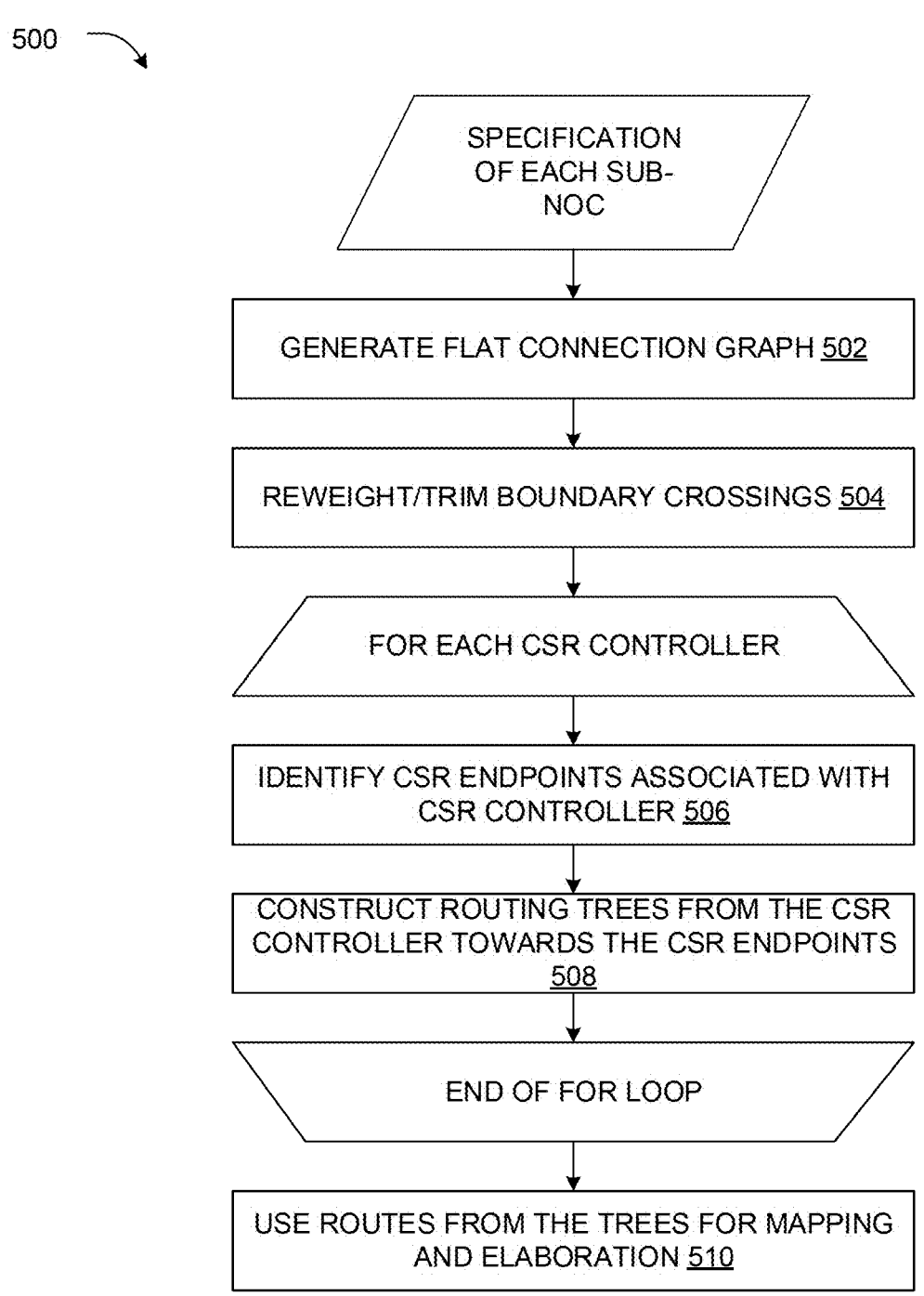
FIG. 5 illustrates a flowchart of a method for automatic generation of CSR network definitions for the sub-NoCs, in accordance with an example implementation.

Referring to FIG. 5, the present disclosure provides a method 500 to generate CSR network definitions based on the specifications of the sub-NoCs that form the NoC.

At step 502, the method 500 includes generating a flat connection graph, based on specifications of the sub-NoCs that form the NoC 402. In some embodiments, the flat connection graph may be generated with CSR endpoints 304 and the CSR controllers 306 as nodes and paths/connections/channels therebetween as edges. In some embodiments, weights may be assigned to each of the edges, based on length, number of overlapping paths, boundary crossing along the paths, and the like. In some embodiments, the flat connection graph may correspond to trees originating from the CSR controllers 306 (i.e. the root/source) and terminating at CSR endpoints 304 (i.e. the leaves). In some embodiments, the flat connection graph may also include edges between the first and the second sets of CSR endpoints 304 which may be connected to each other.

At step 504, the method 500 includes reweighting or trimming boundary crossings 504. In such embodiments, the method 500 may be biased against allowing paths/routes between the CSR controller 306 and the CSR endpoints 304 from crossing different sub-NoCs having different clock domains or power domains, for example. Boundary crossings may be identified based on the presence of the ingress and egress points 404 along edges between the CSR controllers 306 and the CSR endpoints 304. In such embodiments, the edges having boundary crossing may be assigned higher weights than edges that do not cross boundaries of the sub-NoCs. In other embodiments, such edges may be trimmed.

The method 500 may iterate steps 506 and 508 for each CSR controller 306 in the NoC 402. At step 506, the method 500 includes identifying the CSR endpoints 304 that are associated with the CSR controller 306. The CSR endpoints 304 may be endpoints within the same sub-NoC instance as the CSR controller 306, or endpoints of different sub-NoCs than the CSR controller 306. In the latter case, the endpoints 304 may be either below or at the same level as the CSR controller 306 in the hierarchical topology.

Once the CSR endpoints 304 controlled by the CSR controllers 306 are identified, routes/paths may be generated for building the network. At step 508, the method 500 includes constructing routing trees/graphs from the CSR controller 306 towards the associated CSR endpoints 304 thereof. In such embodiments, the routers/paths may be formed as a tree, where the root node/source is the CSR controller 306, and the leaves are the CSR endpoints 304, as shown in FIGS. 6A to 6D. In some embodiments, paths may be determined between the CSR controller 306 and the CSR endpoints 304 using shortest path algorithms. For example, Dijkstra's algorithm (or a modified version thereof to handle break ties between multiple shortest paths) may be used to compute the shortest paths between the CSR controller 306 and the CSR endpoints 304 associated therewith.

In some embodiments, the routes/paths identified may correspond to request channels from the CSR controller 306 to the CSR endpoints 304, response channels from the CSR endpoints 304 to the CSR controllers 306, or both. In some embodiments, response channels and request channels may be implemented along the same route/path. In other embodiments, the request and response channels may be asymmetrical, i.e. different paths may be used for the request and response channels. In some embodiments, routing information for transmission through the routes identified for the response and request channels may not be needed, as the routes may follow single-in and single out, i.e. output port may be known based on input port in the request/response channels.

Figure 6B:
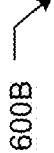
FIGS. 6A to 6D illustrate schematic representations of trees built for each controller, in accordance with an example implementation.
Figure 6B:
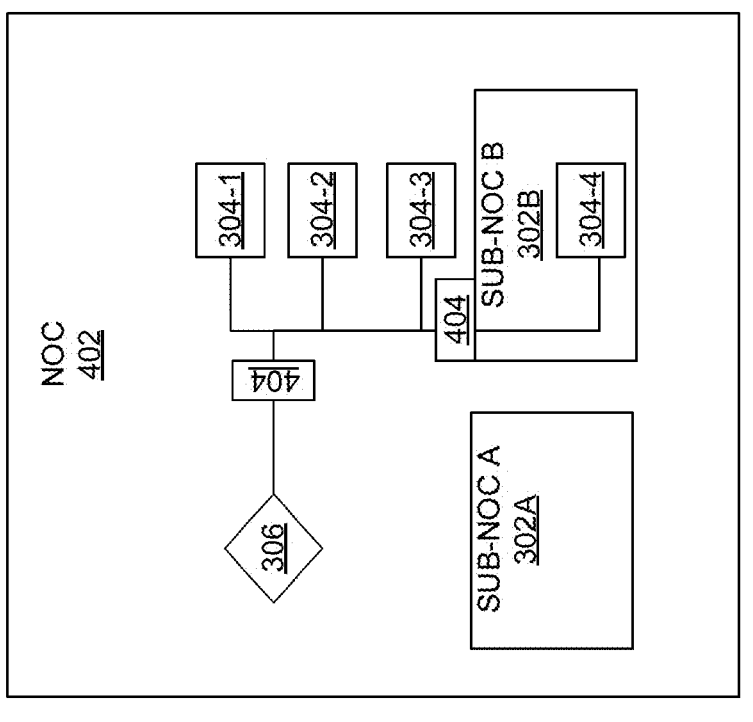
Figure 6A:
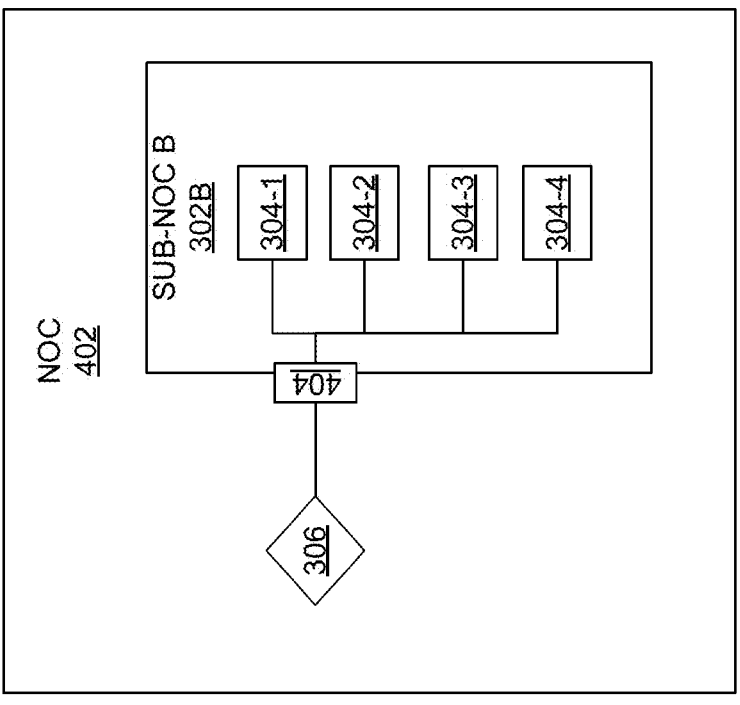
Figure 6D:
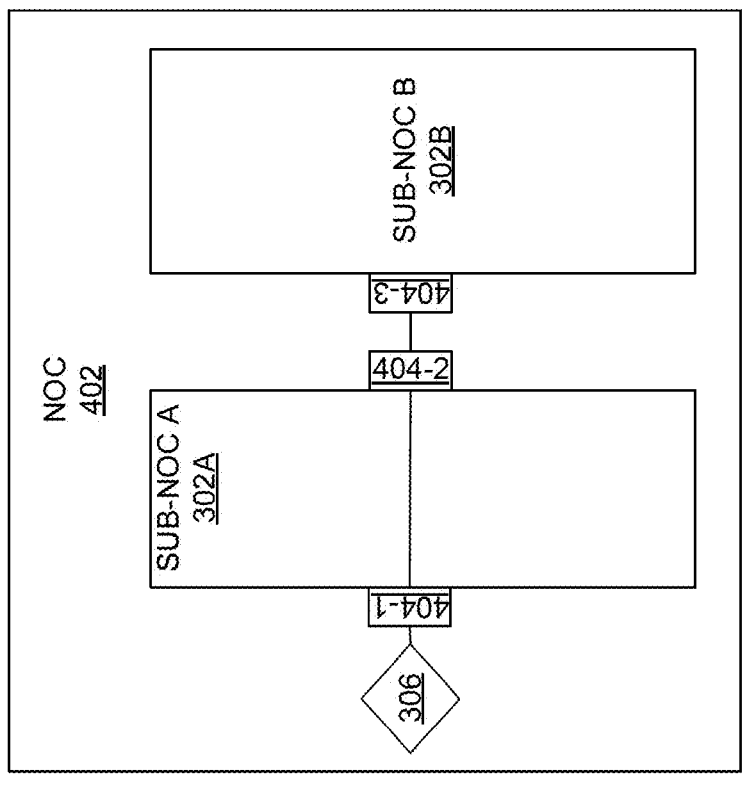

In some embodiments, while higher weights may be assigned for routes/paths that cross boundaries of other sub-NoCs, shortest paths having boundary crossings may be unavoidable in certain topologies of the NoC 402, as shown in FIG. 6D. In such embodiments, routes from the CSR controllers 306 to the CSR endpoints 304 through the ingress points and the egress points 404 (such as 404-1 and 404-2) used for crossing boundaries the sub-NoC (if any) may be determined.

In some embodiments, network definitions of each of the sub-NoCs may be identified from the routing trees or graphs. At step 510, the method 500 may include using the routes from the routing graph/trees for generating mappings and elaboration thereof. The network definitions of the sub-NoCs yielded by the method 500 may be used for generating/actualizing the NoCs 402.

Figure 6C:
Figure 6C:
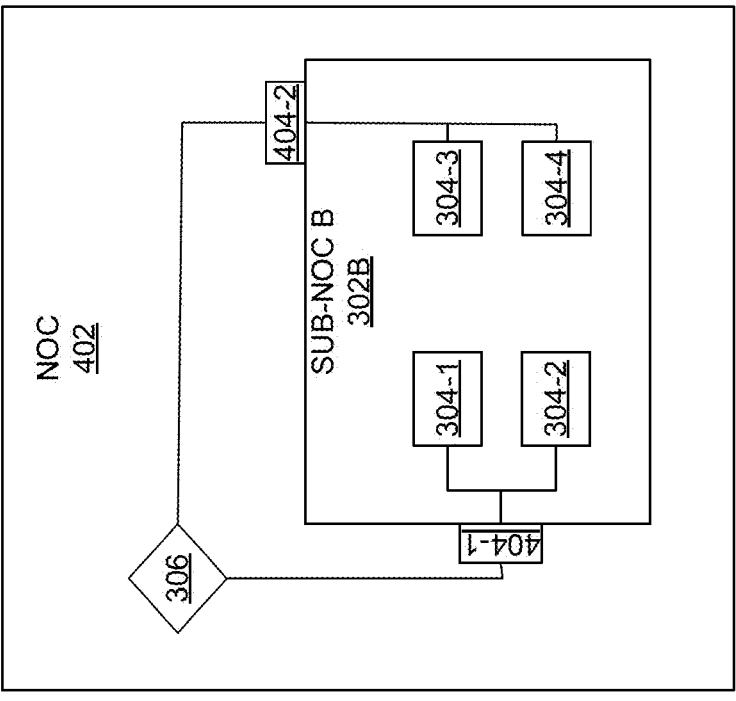

Referring to representations 600A to 600D of FIGS. 6A to 6D, the generated routing trees may have different arrangements/configurations. As stated, the routing trees may originate from the CSR controller 306 and terminate at each of the CSR endpoints 304 associated therewith. In some embodiments, the trees corresponding to the paths may either split after entering the child sub-NoCs (as shown in FIG. 6A), or before entering the child sub-NoC (as shown in FIG. 6B), or both (as shown in FIG. 6C), based on the number of ingress and egress points 404 available at the child sub-NoC. Since the edges of the trees correspond to wires/links/channels between the CSR controllers 306 and the CSR endpoints 304, weights assigned to edges at step 504 of the method 500 may be suitably adjusted to minimize wire lengths while ensuring connectivity between the CSR controllers 306 and the CSR endpoints 304 (or between the CSR endpoints 304).

While higher weights may be assigned to edges that cross the boundaries of the sub-NoCs in the flat connection graph, boundary crossing may be unavoidable in certain cases, such as those shown in FIG. 6D. In such embodiments, the routers may require CSR traffic to switch clock domains and/or power domains in order to reach the CSR controller 306 or the destination CSR endpoint 304. The specifications of such sub-NoCs may define ingress and egress points/ports 404 to be used by routes crossing the sub-NoC instances, such as sub-NoC instance 302A for communicating CSR endpoints 304 in other sub-NoC instance 302B. In the example shown in FIG. 6D, the CSR controller 306 may use a route passing through ingress-egress ports 404-1 and 404-2 of sub-NoC instance 302A, and ingress-egress port 404-3 of the sub-NoC instance 302B to access the CSR endpoints inside sub-NoC instance 302B. In such embodiments, the routes may be computed from the CSR endpoints 304 to the CSR controllers 306 through the access points (corresponding to the CSR controller 306). Further, in embodiments where the routes cross/pass through other sub-NoC instances, separate/different NoC channels may be assigned for such cross-domain routes and other routes associated with the sub-NoC instances through which the cross-domain routes pass through. Assigning separate NoC channels may prevent traffic passing through the cross-domain routes from interfering with traffic passing through the routes of the sub-NoC, and vice versa. In other embodiments, the cross-domain routes and the routes of the sub-NoC may be physically isolated, i.e. provided with separate physical channels for transporting the CSR traffic.

In some embodiments, the method 500 may also include transforming associations between the CSR endpoints 304 and the components thereof in the CSR network definition based on optimization of one or more of, wire cost, address space, area cost, or number of registers. Referring to representations 700A to 700C of FIGS. 7A to 7C, parameters of the registers or banks associated with the CSR endpoints 304 may be optimized based on the aforementioned factors, for example.

Figure 7A:
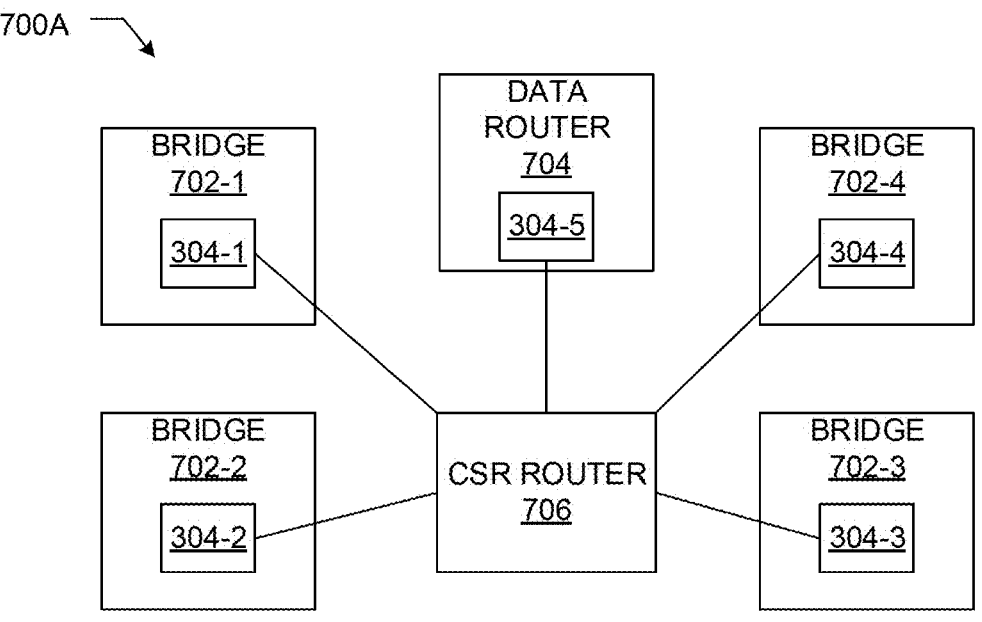
FIGS. 7A to 7C illustrate schematic representation of consolidation of CSRs, in accordance with an example implementation.

As shown in FIG. 7A, NoC components, such as bridges 702-1 to 702-4 and data router 704 of an example NoC, may have separate CSR endpoints 304 associated therewith. For example, the bridges 702-1 to 702-4 may have CSR endpoints 304-1 to 304-4 associated therewith, and the data router 704 may have the CSR endpoint 304-5 associated therewith. In some embodiments, the endpoints 304-1 to 304-5 may be configured to communicate with each other and/or the CSR controller 306 through a CSR router 706. The CSR router 706 may be adapted to transport CSR traffic between entities of the CSR network. In some examples, the clock domains/power domains of the bridges 702-1 to 702-5 may be different. In such embodiments, instead of having a domain crossing elements at each of the links between the CSR router 706 and the bridges 702, the CSR router 706 may be configured to pre-fetch the domain for domain crossing, and eliminate the need for clock domain in the links to the bridges 702. Pre-fetching the domains may reduce the area costs.

Figure 7B:
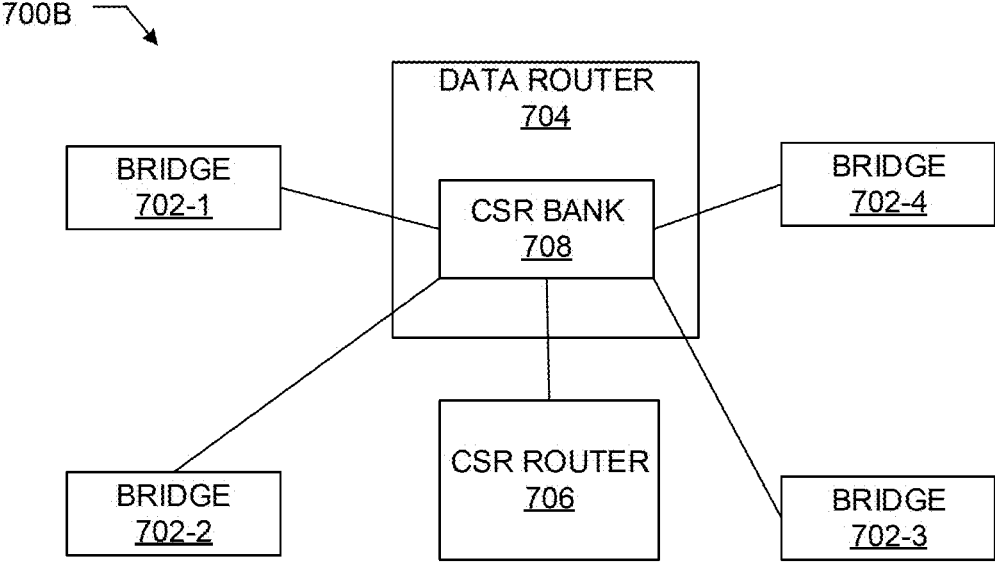
Figure 7C:
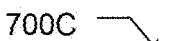
Figure 7C:
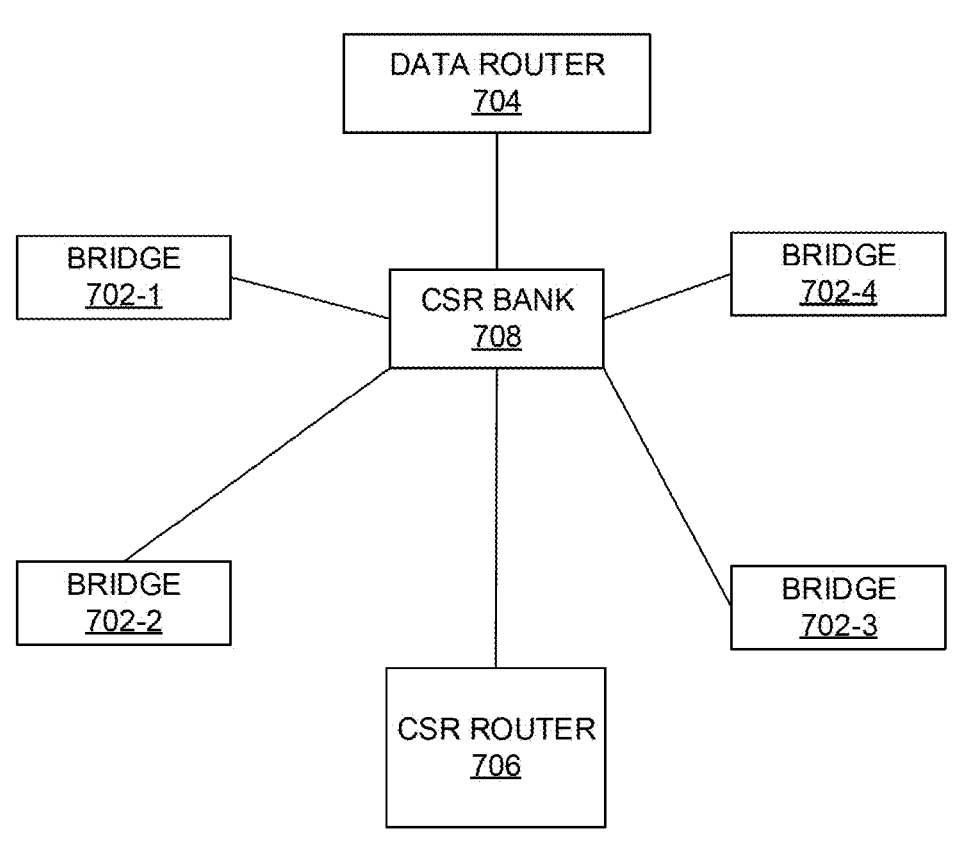

In some embodiments, the CSR endpoints 304-1 to 304-5 may be consolidated, such as into a CSR bank 708. In some embodiments, the CSR bank 708 may be implemented within the data router 704, as shown in FIG. 7B. In other embodiments, the CSR bank 708 may be implemented independently of any NoC component, as shown in FIG. 7C. To reduce area of the CSR network, the registers of the CSR endpoints 304-1 to 304-4 in the bridges 702-1 to 702-4 may be consolidated at the data router 704. In such embodiments, the consolidated CSR bank 708 may be connected to corresponding ports of the bridges 702-1 to 702-4. The bridges 702-1 to 702-4 may be configured to retrieve the values stored in the CSR banks 708 for their operation. Consolidation can reduce area, network complexity, and address complexity of the CSR network while increasing wiring cost between CSR bank and its NoC components. In some embodiments, the decision to consolidate the CSR banks 708 associated with CSR registers of bridges 702-1 to 702-4 connected to the data routers 704 may be made based on length and/or complexity of the wires/links between the data router 704 and the bridges 702-1 to 702-4. Consolidation may reduce the area costs by reducing the number of unused bits of the registers.

Further, consolidation may also reduce the address bits complexity. For example, if each of the CSR endpoints associated with 5 bridges have 17 CSR registers, 3 bits may be used for identifying/locating the bridges and 5 bits may be required for identifying/locating the CSR registers, thereby requiring a total of 8 bits. However, when the CSR registers are consolidated, the consolidated CSR endpoint 304 may include 85 registers (i.e. 5 bridges times 17 registers), which may require only 7 bits to identify each of the 85 registers.

Figure 8:
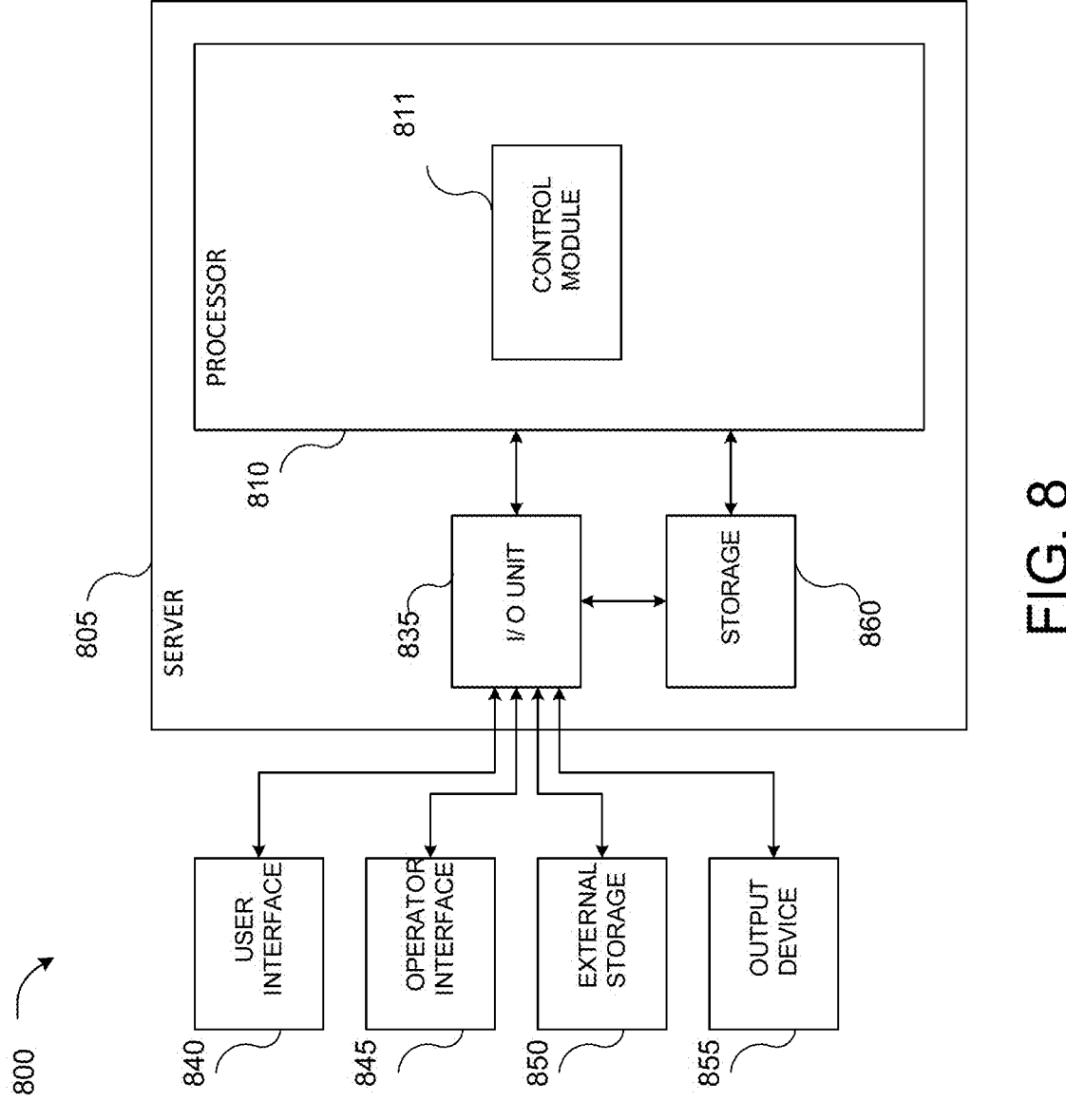
FIG. 8 illustrates a computer/server block diagram upon which the example implementations described herein may be implemented.

In some embodiments, the method 500 of the present disclosure may be implemented in a computer system/apparatus. FIG. 8 illustrates an example computer system 800 on which example embodiments may be implemented. The computer system 800 includes a server 805 which may include an Input/Output (I/O) unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to, optical disks, magnetic disks, read-only memories, random access memories, solid state devices, and drives, or any other types of tangible media suitable for storing electronic information, or computer-readable signal mediums, which can include transitory media such as carrier waves. The I/O unit 835 processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media, or any other medium from which a computer can read executable code. The server may also be connected to an output device 855, such as a display to output data and other information to a user, as well as request additional information from a user. The connections from the server 805 to the user interface 840, the operator interface 845, the external storage 850, and the output device 855 may be via wireless protocols, such as the 802.11 standards, Bluetooth® or cellular protocols, or via physical transmission media, such as cables or fiber optics. The output device 855 may therefore further act as an input device for interacting with a user.

The processor 810 may include a control module 811 that is configured to implement the method 500, among other functions.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method for generating a Network on Chip (NoC) system, the method comprising:

intaking a specification comprising, for each sub-NoC design:

hierarchical topology and Control/Status Register (CSR) controllers of the each sub-NoC with locations;

for each of the CSR controllers in the sub-NoC, a set of CSR endpoints that is communicatively coupled to the each of the CSR controllers; and ingress and egress points of a boundary of the each sub-NoC;

generating a CSR network definition for the each sub-NoC design from computation of routes between the locations of each pair of the CSR controllers and the set of CSR endpoints that communicate via a CSR routing graph defined from the hierarchical topology that is adjusted based on the ingress and egress points; and generating a NoC based on the CSR network definitions, wherein the specification further comprises controller access points, and a mapping of the set of CSR endpoints and the controller access points to the CSR controllers of the NoC, and wherein the mapping is generated for the specification.

2. The method of claim 1, wherein the computation of routes further comprises computing routes between the set of CSR endpoints and controller access points to the CSR controllers of the NoC.

3. The method of claim 1, further comprising transforming the set of CSR endpoints to component association in the CSR network definition based on optimization of one or more of: wire cost, address space, area cost, or number of registers.

4. The method of claim 1, wherein the CSR routing graph is reweighted and trimmed based on the ingress and egress points.

5. The method of claim 1, wherein the set of CSR endpoints comprise endpoints outside of the each sub-NoC design.

6. A non-transitory computer-readable storage medium storing instructions for executing a process, comprising:

intaking a specification comprising, for each sub-NoC design:

hierarchical topology and Control/Status Register (CSR) controllers of the each sub-NoC with locations;

for each of the CSR controllers in the sub-NoC, a set of CSR endpoints that is communicatively coupled to the each of the CSR controllers; and ingress and egress points of a boundary of the each sub-NoC;

generating a CSR network definition for the each sub-NoC design from computation of routes between the locations of each pair of the CSR controllers and the set of CSR endpoints that communicate via a CSR routing graph defined from the hierarchical topology that is adjusted based on the ingress and egress points; and generating a NoC based on the CSR network definitions, wherein the specification further comprises controller access points, and a mapping of the set of CSR endpoints and the controller access points to the CSR controllers of the NoC, and wherein the mapping is generated for the specification.

7. The non-transitory computer-readable storage medium of claim 6, wherein the computation of routes further comprises computing routes between the set of CSR endpoints and controller access points to the CSR controllers of the NoC.

8. The non-transitory computer-readable storage medium of claim 6, further comprising transforming the set of CSR endpoints to component association in the CSR network definition based on optimization of one or more of: wire cost, address space, area cost, or number of registers.

9. The non-transitory computer-readable storage medium of claim 6, wherein the CSR routing graph is reweighted and trimmed based on the ingress and egress points.

10. The non-transitory computer-readable storage medium of claim 6, wherein the set of CSR endpoints comprise endpoints outside of the each sub-NoC design.

11. A system, comprising a memory that stores a control module, and a processor, coupled to the memory, that executes or facilitates execution of the control module, the control module configured to:

intake a specification comprising, for each sub-NoC design:

hierarchical topology and Control/Status Register (CSR) controllers of the each sub-NoC with locations;

for each of the CSR controllers in the sub-NoC, a set of CSR endpoints that is communicatively coupled to the each of the CSR controllers; and ingress and egress points of a boundary of the each sub-NoC;

generate a CSR network definition for the each sub-NoC design from computation of routes between the locations of each pair of the CSR controllers and the set of CSR endpoints that communicate via a CSR routing graph defined from the hierarchical topology that is adjusted based on the ingress and egress points; and generate a NoC based on the CSR network definitions, wherein the specification further comprises controller access points, and a mapping of the set of CSR endpoints and the controller access points to the CSR controllers of the NoC, and wherein the mapping is generated for the specification.

12. The system of claim 11, wherein the computation of routes further comprises computing routes between the set of CSR endpoints and controller access points to the CSR controllers of the NoC.

13. The system of claim 11, further comprising transforming the set of CSR endpoints to component association in the CSR network definition based on optimization of one or more of: wire cost, address space, area cost, or number of registers.

14. The system of claim 11, wherein the CSR routing graph is reweighted and trimmed based on the ingress and egress points.

15. The system of claim 11, wherein the set of CSR endpoints comprise endpoints outside of the each sub-NoC design.

* * * * *